United States Patent [19]

Kubo et al.

[11] 4,122,506

[45] Oct. 24, 1978

[54] MAGNETICALLY RECORDING AND REPRODUCING APPARATUS

[75] Inventors: Kanji Kubo, Katano; Osahiko Yano, Kadoma, both of Japan

[73] Assignee: Matsushita Electric Industrial Co., Ltd., Osaka, Japan

[21] Appl. No.: 791,469

[22] Filed: Apr. 27, 1977

[30] Foreign Application Priority Data

May 4, 1976 Japan ..................................... 51-51027

[51] Int. Cl.² ............................................ G11B 15/66
[52] U.S. Cl. ...................................... 360/130; 360/95
[58] Field of Search ................... 360/130, 132, 93, 95, 360/84–85; 226/196

[56] References Cited

U.S. PATENT DOCUMENTS

| | | | |
|---|---|---|---|
| 3,691,315 | 9/1972 | Ellmore | 360/84 |
| 3,784,761 | 1/1974 | Moritan et al. | 360/95 X |
| 3,864,742 | 2/1975 | Katoh | 360/85 |
| 3,871,025 | 3/1975 | Nakamoto | 360/95 |

Primary Examiner—John H. Wolff
Attorney, Agent, or Firm—Wenderoth, Lind & Ponack

[57] ABSTRACT

A magnetic tape feeding apparatus for a magnetic recording and reproducing apparatus having a guide drum with a magnetic tape partially wrapped around the drum having therein one or more magnetic heads. A pair of first guide posts inclined at a predetermined angle with respect to the datum plane, a pair of second posts perpendicular to the datum plane and the drum are arranged in a manner such that the tape travels without any twisting action and the longitudinal center line of the tape in the vicinities of the tape supply and take-up reels lies in a plane parallel with the datum plane.

5 Claims, 11 Drawing Figures (PRIOR ART)

MAGNETICALLY RECORDING AND REPRODUCING APPARATUS

BACKGROUND OF THE INVENTION

The invention relates to a magnetic recording and reproducing apparatus for magnetically recording and reproducing a video signal or the like on a magnetic tape, and more particularly to a tape feeding system therefor in which various kinds of cylindrical tape guide posts are so arranged as to pull the magnetic tape out of a cassette which contains therein supply and take-up reels mounted on spaced parallel axes to lead it along a path parallel with the datum plane parallel to the upper or lower surface of the cassette and wind the tape partially and spirally around a cylindrical tape guide drum (hereinafter simply referred to as a drum) which contains one or more rotary magnetic heads therein, and which is so arranged as to feed the tape smoothly and without jitter, flutter, ripple and other mechanical distortions.

Figure 1:
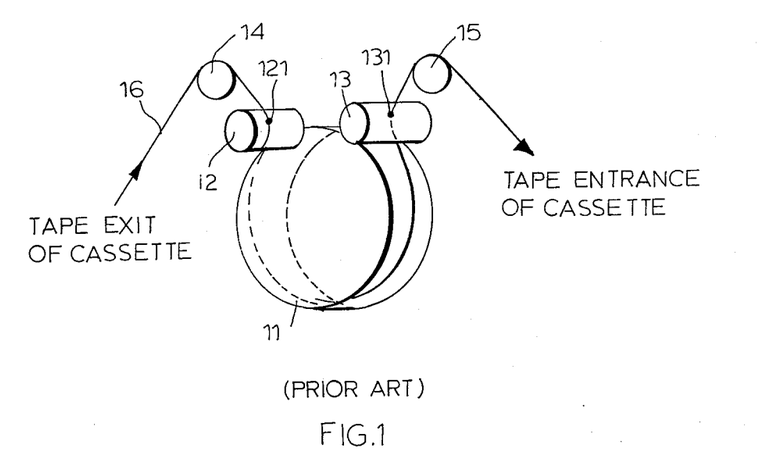
FIG. 1 is a schematic plan view of a principal portion of a prior art apparatus for magnetically recording and reproducing a video signal.

A typical tape feeding system to feed the tape smoothly and stably from the cassette along the tape travelling path parallel to the datum plane is shown in FIG. 1, and has a combination of a drum 11 inclined with respect to the datum plane, a pair of cylindrical tape guide posts 12 and 13 positioned adjacent the drum, and a pair of cylindrical tape guide posts 14 and 15 perpendicular to the datum plane, the posts 14 and 15 being provided for adjustment of the arcuate distance of interengagement between the tape and the guide posts 12 and 13. In FIG. 1, the tape is indicated only by the longitudinal tape center line 16.

The guide posts 14 and 15 arranged perpendicularly to the datum plane cause the tape running parallel with the datum plane to change its direction, but do not function to change the height and the parallelism of the tape with respect to the datum plane. Therefore, in order to feed the tape stably at the tape entrance and exit of the cassette, it is necessary to satisfy at least the following two conditions:

(a) Condition of Height of the Tape: Heights of the tape center line with respect to the datum plane at the point 121 where the tape initially engages the inclined post 12 and the point 131 where it leaves the inclined post 13 should be equalized.

(b) Condition of parallelism of the Tape: The tape center line in its direction of movement should is to be parallel to the datum plane in the tape feeding path between the tape exit from the cassette and the point 121 and between the point 131 and the tape entrance to the cassette.

A method for determining the mechanical dimensions of the arrangement of the structural elements of the apparatus so as to satisfy the two conditions (a) and (b) is disclosed in Japanese laid-open application for patent, No. Showa 47-5474. In accordance with this application, because the drum 11 and the inclined posts 12 and 13 are inclined in such a way that the axes thereof are parallel to each other, the tape travels in a twisted path between the inclined post and perpendicular post, although it travels stably in the path between the drum and the inclined posts. In the tape path between these posts, the tape length along the longitudinal center line becomes different from the length along the upper and lower edges thereof, whereby there occurs a stress distribution in the tape in the width direction thereof, resulting in the mechanical distortion of the tape. If the tape length between the inclined and perpendicular posts is large, the stress added to the tape by the mechanical distortion becomes sufficiently uniform that feeding of the tape is not influenced by the stress. However, where these two posts are mounted in pairs on a loading arm which is provided for pulling the tape out of the cassette and wrapping the tape around the drum, it is necessary to arrange these posts close to each other because they have to return to the cassette opening in the tape unloading condition. Therefore, in such an arrangement, it is difficult to avoid causing excessive stress in the tape, thereby giving rise to above described difficulty.

Furthermore, when the apparatus is in a recording or reproducing mode, the tape pulled out of the cassette travels along the predetermined path through tape guiding means (not shown in Figure) such as a limiter post, an erase head, a tape tension control arm, etc., and is led to the drum including one or more heads therein and thence to a group of cylindrical guide posts. Thereafter, the tape is fed to the take-up reel in the cassette through a limiter post, an audio control head and tape driving means, composed of a capstan and a pinch roller, which drives the tape at a predetermined speed. More particularly, in order to obtain a high compatibility, the drum containing one or more rotary heads is formed with a step portion arranged spirally for engaging the edge of the tape and accurately fixing its position. For this reason, it is necessary to arrange limiter posts in the vicinity of the points where the tape initially engages and leaves the drum, for pressing the tape against the step portion so as to restrict the movement in the width direction thereof. In the event that each of these limiter posts is placed between the inclined post and the perpendicular post, if the tape is twisted therebetween, these limiter posts cause an abnormal stress distribution in the tape, thereby preventing stable tape feeding.

Thus, in order to feed the tape stably and without mechanical distortions, the tape feeding system must be so arranged as to satisfy not only the conditions (a) and (b), but also following condition.

(c) Condition of No twisting of the Tape: The tape is to travel without any twisting action in the path between the drum and the inclined post and between the inclined post and the perpendicular post.

SUMMARY OF THE INVENTION

Accordingly, the object of the present invention is to provide an apparatus specifically designed for the magnetic recording and reproducing of a video signal, which overcomes the disadvantages of the prior art apparatus, with the tape being fed smoothly and stably and without any twisting action.

Other and further objects, features and advantages of the invention will appear more fully from the following description.

DETAILED DESCRIPTION OF PREFERRED EMBODIMENTS

Figure 2:
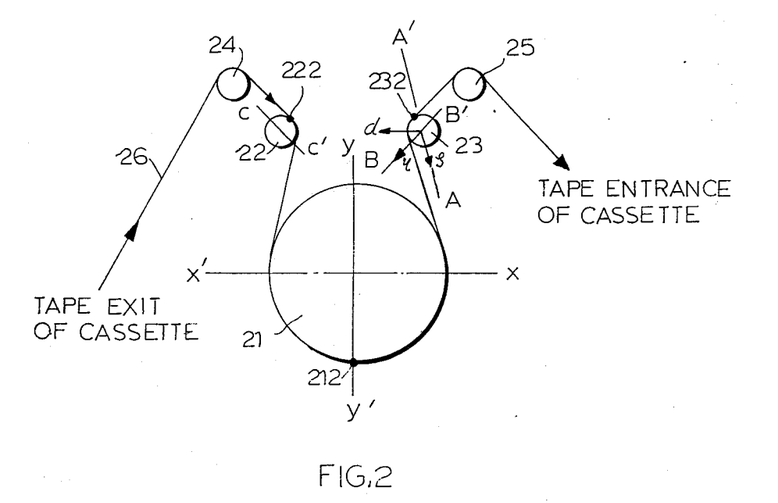
FIG. 2 is a schematic plan view of a tape feeding system used for an explanation of the condition in which the tape is not twisted.

Referring to FIG. 2, reference numeral 21 designates a cylindrical tape-guide drum composed of an upper and lower cylinder, the cylinders being aligned coaxially in spaced relationship to define an annular gap and having the same diameter. In the drum 21, there is provided a rotary disc rotatable about the axis of the drum and having one or more magnetic heads with tips projecting radially outwardly through the annular gap for engagement with the tape. Reference numerals 24 and 25 denote tape guide posts perpendicular to the datum plane and arranged symmetrically with respect to the line y—y' line passing through the axis of the drum 21 and the intermediate point 212 of the tape wrap around or arcuate distance of contact of the tape and the drum. Reference numerals 22 and 23 designate tape guide posts respectively positioned between the drum 21 and the post 24 and between the drum 21 and the post 25, and arranged symmetrically with respect to the y—y' line. Reference numeral 26 denotes the longitudinal center line of the tape. Where the tape is fed around two spaced cylindrical guide means, the direction in which either of the two guide means may be inclined without twisting the tape is the direction which is parallel to the tape being fed therebetween. For example, if the drum 21 is fixed, the post 23 may be inclined only in the direction A—A' parallel to the tape moving direction in the path between the drum 21 and the post 23, as shown in FIG. 2. Similarly, if the post 25 is fixed, the post 23 may be inclined only in the direction B—B' parallel to the tape moving direction in the path between the posts 25 and 23. For this reason, if the post 23 is inclined at an angle ρ in the direction A—A' with respect to an axis perpendicular to the datum plane and further, the drum 21 and post 23 are respectively inclined at an angle α in the X'-direction perpendicular to the y—y' axis, the tape is not twisted in the path between the drum 21 and post 23. In the above, it is described that the post 23 is inclined in the two directions. However, the direction in which the post 23 is inclined is equal to the case in which the post is inclined at an angle η in the direction B which is the sum of the vector components of these two angles. Therefore, if the direction B is parallel to the direction of movement the tape in the path between the post 23 and the post 25 arranged perpendicularly to the datum plane, twisting of the tape in the path between the posts 23 and 25 does not occur. As for the post 22, it may be inclined in the direction C—C' in the same way as described above.

In other words, the drum 21 and the posts 22, 23, 24 and 25 have to be so arranged as to satisfy the condition that the direction of a resultant vector which is the vector sum of a vector component parallel with the direction of movement of the tape in the path between the drum 21 and the post 23 and a vector component of the angle of the inclination of the drum 21 is parallel with the direction of movement of the tape between the posts 23 and 25, and that the direction of a resultant vector which is the vector sum of a vector component parallel with the direction of movement of the tape in the path between the drum 21 and the post 22 and a vector component of the angle of inclination of the drum 21 is parallel with the direction of movement of the tape between the posts 22 and 24.

Figure 3:
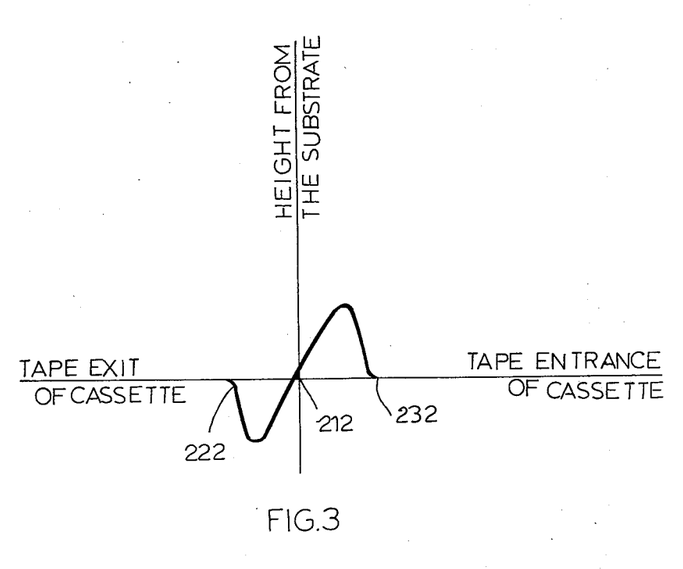
FIG. 3 is a graph showing the heights of respective points of the center line of the tape in the direction of movement thereof with respect to a datum plane.

Moreover, where the apparatus employs a cassette of a type which contains therein supply and take-up reels mounted on spaced parallel axes, the drum 21 and the posts 22, 23, 24 and 25 have to be so arranged as to satisfy not only the condition that there is no twisting of the tape, but also the condition that a plane formed by the longitudinal tape center lines in the path between a supply reel and the post 22 and in the path between a take-up reel and the post 23 is parallel to the datum plane. When the posts 22 and 23 are arranged symmetrically with respect to the line Y—Y' and the heights of the tape center line with respect to the datum plane at the point 222 where the tape initially engages the post 22 and at the point 232 where tape leaves the post 23 are respectively made equal, the heights of the tape center line at the respective points becomes as shown in FIG. 3. As will be seen from the FIG. 3, the heights of the tape center line are equal at the tape entrance and exit of the cassette, the intermediate point 212 and the points 222 and 232.

The theoretical equations by which the foregoing three conditions are satisfied are derived as follows: a detailed description of the process for deriving these equations will be given hereinafter.

(a) The equation which satisfies the condition of the height of the tape:

$$\tan\alpha = \frac{\sin\theta \cdot \sin\zeta - \theta \cdot \tan\eta \cdot \cos\zeta - \frac{D}{2r}(\frac{\pi}{2} + \beta)\tan s - \frac{l}{r}\sin s}{\sin\theta \cdot \cos\zeta \cdot \sin\beta - (1 - \cos\theta)\cos\beta + \theta\tan\eta \cdot \sin\zeta \cdot \sin\beta - \frac{D}{2}\cos\beta + \frac{l}{r}\cos s \cdot \sin\beta} \quad (1)$$

(b) The equation which satisfies the condition of parallelism of the tape:

$$\tan\alpha = \frac{\cos\zeta \cdot \tan\eta - \cos\theta \cdot \sin\zeta}{\sin\theta \cdot \cos\beta - \cos\theta \cdot \cos\zeta \cdot \sin\beta - \sin\zeta \cdot \sin\beta \cdot \tan\eta} \quad (2)$$

(c) The equation which satisfies the condition of no twisting of the tape:

$$\tan\gamma = \frac{\sin\theta \cdot \sin\beta + \cos\theta \cdot \cos\zeta \cdot \sin\beta \cdot \cos\alpha - \tan\eta \cdot \sin\zeta \cdot \cos\beta}{\sin\theta \cdot \cos\beta \cdot \cos\alpha - \cos\theta \cdot \cos\zeta \cdot \sin\beta \cdot \cos\alpha - \tan\eta \cdot \sin\zeta \cdot \sin\beta \cdot \cos\alpha - \cos\theta \cdot \sin\zeta \cdot \sin\alpha + \tan\eta \cdot \cos\zeta \cdot \sin\alpha} \quad (3)$$

In these equations the significance of the terms is as follows:

D: diameter of the tape guide drum r: radius of the inclined post s: lead angle of the tape to the drum (radian)

β: over-wrap angle of the tape wrap around the guide drum (radian)

η: angle of inclination of the inclined post to an axis perpendicular to the datum surface l: effective length of the tape between the point where the tape leaves the inclined post and the point where the tape initially engages the guide drum or between the point where the tape leaves the guide drum and the point where the tape engages the inclined post.

α: angle of inclination of the guide drum (radian)

ρ: angle of inclination of the inclined post in the direction parallel to the tape in the path between the guide drum and the inclined post (radian)

θ: tape wrap angle around the inclined post (radian) measured angularly about the post axis from the point where the tape initially engages the post to the point where it leaves the post.

γ: angle between the inclined post and the x—x' axis (radian)

Among the variables in the equations (1)–(3), the variables other than α, ρ, θ, η and γ may be necessarily determined when dimensions of magnetic recording locus on the tape is predetermined. Furthermore, η, γ is a function of ρ and other known invariables and can be expressed by the following equations:

$$\cos\eta = \sin\alpha \cdot \sin\beta \sin\zeta + \cos\alpha \cdot \cos\zeta \quad (4)$$

$$\sin\gamma = \frac{\sin\zeta \cos\beta}{\sin\eta} \quad (5)$$

Therefore, the variables in the equations (1)–(3) are only α, ρ and θ. Because there are three equations with the three variables, α, ρ and θ can be determined when the other constants are predetermined.

As will be seen from the foregoing description, if the drum 21 and the posts 22–25 are so arranged as to satisfy the conditions of equations (1)–(5), abnormal stress is not generated in the tape whereby a tape feeding system which carries out stable and smooth tape-travelling can be obtained.

Figure 4:
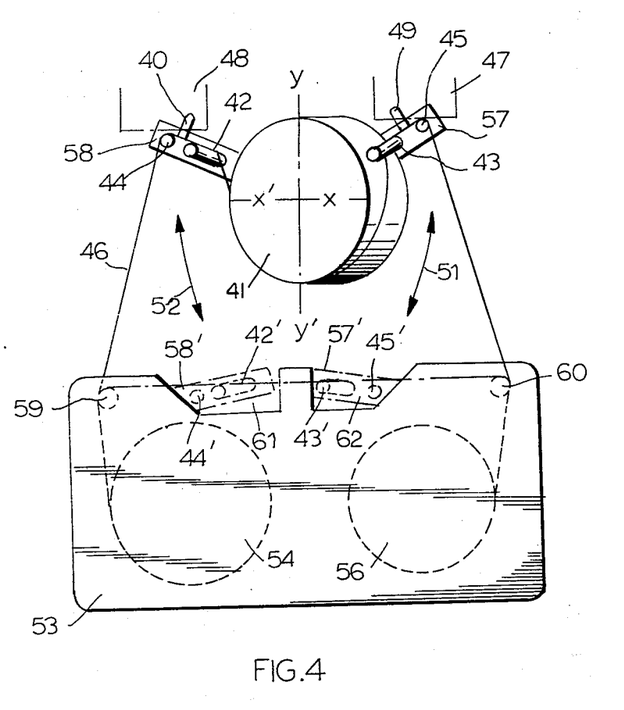
FIG. 4 is a schematic plan view showing a tape feeding system of the present invention.

FIG. 4 is a schematic plan view showing one embodiment of a tape feeding system of the present invention, this feeding system being provided with a loading mechanism which serves to pull the tape out of the cassette and to wind it helically around the surface of the drum and also being provided with an unloading mechanism which serves to return the tape completely into the cassette. In FIG. 4, a drum 41, inclined posts 42 and 43, and perpendicular posts 44 and 45 are arranged in predetermined positions at predetermined angles in accordance with the foregoing equations. A tape 46 wound on a supply reel 54 housed in a cassette 53 is fed over a tape guide 59 provided in the cassette, a perpendicular post 44 and an inclined post 42, and is engaged with the drum along an arcuate path around the drum. Thereafter, the tape is fed over an inclined post 43, a perpendicular post 45 and a tape guide 60 provided in the cassette and is wound on a take-up reel 56. In FIG. 4, other elements of the recording and reproducing apparatus lying along the tape path, such as a capstan, an audio/control head, an erase head, etc., are omitted.

In a magnetic recording and reproducing apparatus employing the tape cassette of a type which contains two reels respectively mounted on spaced parallel axes, a loading mechanism for engagement with the drum 41 and the tape initially stored in the cassette becomes necessary. The best way to construct a loading mechanism which can rationally and simply embody the tape feeding system as shown in FIG. 4 is to use the cylindrical guide posts 42–45 not only as a tape guide means but also as a tape pull-out means for pulling the tape out of the cassette. In FIG. 4, the posts 42 and 44, and the posts 43 and 45 are fixedly mounted on supporting members 58 and 57, respectively. When the apparatus is brought into the recording and reproducing mode, the supporting member is moved by a driving means (not shown), and therefore, the posts mounted thereon and initially placed in the cassette openings 61 and 62 pull the tape out of the cassette and are transported to the predetermined position in the vicinity of the drum for engagement of the tape with the drum. When the apparatus is in a mode other than the recording and reproducing mode, the posts are again returned back into the cassette opening, with the take-up reel rotating in the tape winding-up direction whereby the tape is completely returned to the cassette. Namely, when the loading operation is carried out, the supporting members 57' and 58' are moved along the path as shown by arrows 51 and 52 until parts of moving members, for instance, parts of the perpendicular posts 44 and 45 come in contact with stop members 47 and 48 fixed on a substrate of the apparatus, and then, the posts 42–45 are fixed at the predetermined positions in the vicinity of the drum. Reference numerals 40 and 49 designate limiter means which restrict the height of the tape with respect to the datum plane, the limiter means being fixedly mounted on the stop members 47 and 48.

Where the posts 42–45 are so arranged as to satisfy the relationship of the equations (1)–(5), the tape will be fed smoothly and stably. In fact, however, because of aberrations which occur in manufacturing the elements and in assembling these elements, values of the above-mentioned dimensions D–θ deviate from the design values thereby failing to satisfy the conditions (a)–(c) for stable tape-feeding. Therefore, in order to make the tape feed stable, adjustment procedures such as adjustment of the position of the stop members, adjustment of twisting of the tape, and adjustment of the limiter means become necessary. In this instance, as shown in FIG. 2, the tape 26 pulled out of the cassette opening is fed along the predetermined path over the guide members such as limiter posts (not shown in Figure) and is wound on the perpendicular post. Thereafter, it is wound at a predetermined angle on the inclined post 22 which is inclined in the direction C—C' with respect to the datum plane to thereby change its height and direction of movement with respect to the datum plane. The tape is further fed to the drum 21 inclined in the direction X—X' at a predetermined angle and is helically wound therearound over an angle of about 180°. The tape leaving the drum is guided by the inclined post 23 which is inclined in the direction B—B' and thereby the height and moving direction are again changed. Thereafter, it is wound on the perpendicular post 25 at a predetermined angle and fed to the cassette opening over the limiter post, capstan, etc., (not shown in the Figure).

A further feature of the present invention is that adjustments of the tape feeding path to obtain a stable tape-feeding condition can be made by adjusting the positions of the perpendicular posts 24 and 25 and the inclined posts 22 and 23, with respect to the drum so that the tape guided by the perpendicular post 24 is fed to the perpendicular post 25 and thence to the cassette opening over optional tape guide means, for satisfying the condition of stable tape feeding. The tape feeding system as shown in FIG. 2 is designed for a video tape recorder which employs a cassette mounted parallel to the datum plane and containing two reels mounted on spaced parallel axes. In this system, stable tape running can be obtained by arranging the tape guiding means in such a manner that the plane formed by connecting the point 222 where the tape initially engages the inclined post 22, the midpoint 212 of the tape contact angle with the drum and the point 232 where the tape leaves the inclined post is parallel to the datum plane and in such a manner that the condition of no twisting of the tape is satisfied in the tape feeding path between the inclined posts 24 and 25.

In the tape feeding system as shown in FIG. 2, it may be considered that the posture of tape being fed is in a 180°-rotary symmetry with respect to the axis Y—Y' passing through the midpoint 212. Therefore, for adjustment for stable tape feeding, if the method of adjusting the posture of the tape before and after the inclined post 23 is established, the same may be applied to that before and after the inclined post.

As described above, aberrations which occur in manufacturing the structural elements and in assembling these elements cause variations in the height of the longitudinal center line of the tape with respect to the datum plane at the point 232, variations in the degree of parallelism of the tape with respect to the datum plane in the path between the point 232 and the cassette opening, and twisting of the tape. In order to correct these variations and twisting of tape, three adjusting mechanisms which can independently adjust the height, the degree of parallelism and the twisting of the tape become necessary. However, as will be described hereinafter, it is difficult to make these three adjustments independently.

Figure 5:
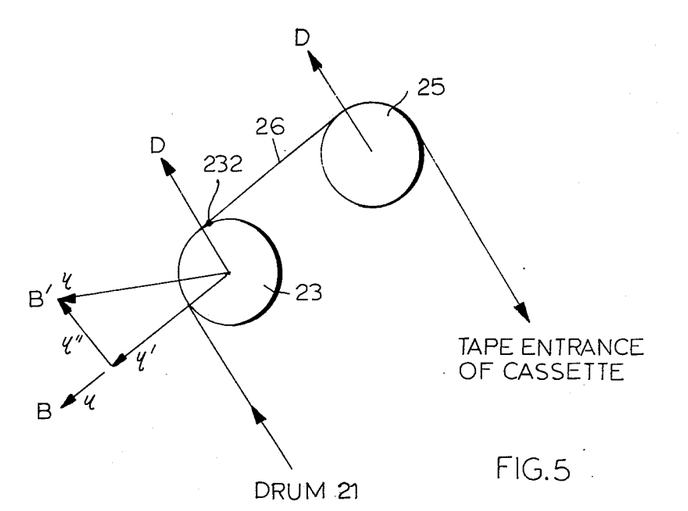
FIG. 5 is a partial plan view of the tape feeding system shown in FIG. 2.

FIG. 5 is a partial plan view of the tape feeding system shown in FIG. 2. In this Figure, the same structural elements as those shown in FIG. 2 are designated by the same reference numerals. As will be seen from the foregoing description, when the tape 23 is inclined at angle $\eta$ expressed by a vector in the $\beta$-direction, a very smooth travel of the tape is obtained without any twisting action. However, when it is inclined at an angle $\eta'$ in the $\beta$-direction, the tape is twisted as it travels between the post 23 and the drum. In the tape feeding system so designed that the tape travels parallel to the datum plane when the post 23 is inclined at angle $\eta$ in the $\beta$-direction, if the post is inclined at angle $\eta'$ in the $\beta$-direction, the tape is fed at an angle which is the difference between $\eta$ and $\eta'$. This is the same as in the case where the post is inclined at angle $\eta$ in the $\beta'$-direction. In this case, the tape is twisted by the difference between angles $\eta$ and $\eta'$ in the path between the post 23 and the drum 21, and travels while being twisted by angle $\eta'$ in the path between the posts 23 and 25. Furthermore, in this case, the direction of movement of the tape is also changed with respect to the datum plane. Thus, where the tape is twisted in the tape feeding system of the present invention, degree of parallelism of the tape with respect to the datum plane is also changed. This means that it is difficult to correct the twisting of the tape without affecting the parallelism thereof. This phenomenon appears only in a system so arranged that the post 25 is perpendicular to the datum plane in order to obtain smooth travel of the tape and the drum is not moved once it is placed at the predetermined relationship with respect to the datum plane.

Next, an adjustment of tape height with respect to the datum plane will be described with reference to the point 232 shown in FIG. 2. The tape travelling in the path between the drum 21 and the post 23 travels at a specific angle with respect to the datum plane. Therefore, when the posts 23 and 25 are moved parallel to the tape in the path between the post 23 and the drum 21 in the D direction, the tape height with respect to the datum plane at the point 232 becomes small as compared with an initially designed height. However, in this case, the degree of parallelism of the tape with respect to the datum plane remains unchanged and no twisting action is added to the tape in the path between the point 232 and the cassette opening.

A specific embodiment of the present invention will be described in the following.

Figure 6:
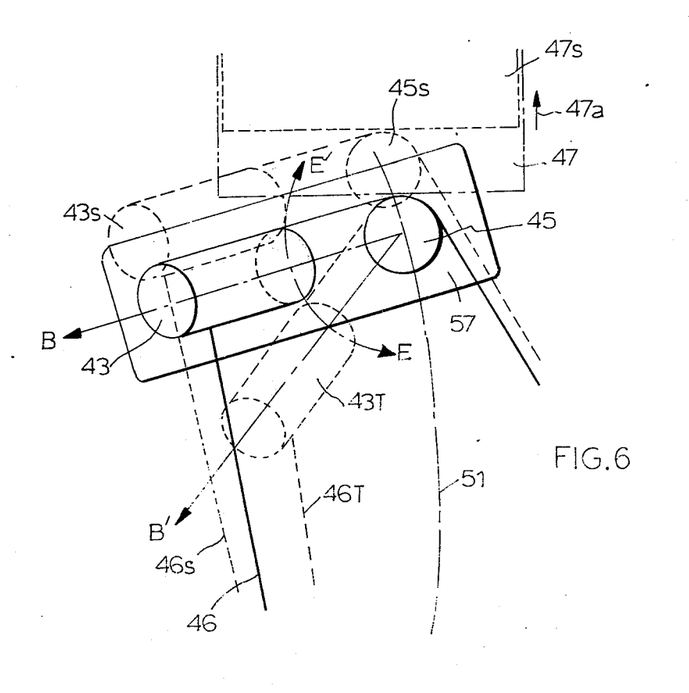
FIG. 6 is a schematic plan view showing an embodiment of an adjusting mechanism used for adjustment of the tape feeding system in accordance with the present invention.

FIG. 6 shows a part of the tape feeding system of FIG. 4, the same elements as those shown in FIG. 4 being designated by the same reference numerals. The adjustment of the tape height as described above is made by moving the stop 47 in the direction 47a, the stop being adjustably mounted on the substrate. In this embodiment, when the apparatus is in a loading operation, the supporting member 57 to which the posts 43 and 45 are secured is moved by driving means so that the post 45 is transported along the locus 51 and is fixed in in a position in which part of the post 45 is engaged with the stop 47 which has previously had its position adjusted. In this arrangement, when the stop 47 is moved to the position denoted by 47s, the posts 43 and 45 are respectively fixed at the positions 43s and 45s. Therefore, the limiter means 49 should be secured to the stop 47.

In the event that the tape height adjustment is mainly made by the limiter means 49, when the tape is fed it is subjected to an abnormal stress and the edge of the tape is thereby damaged. For the reason, it is undersirable to use the limiter means as the main adjustment means for adjusting the tape height and therefore adjustment by means of the stop is necessary.

On the other hand, the twist and the degree of parallelism of the tape have a close relation to each other, and therefore, these adjustments are made by changing the direction of inclination of the post 43 or the angle of inclination thereof. If the inclined post 43 is rotated in the direction E—E' around the axis of the perpendicular post 45, the direction of inclination of the inclined post is changed. Namely, it becomes possible to make the adjustments of twisting and degree of parallelism of the tape.

As will be seen from the foregoing, deviations of the mechanical dimensions from the designed values cause deviations of the tape height with respect to the datum plane, and of the tape moving direction with respect to the datum plane, and the tape twist in the path between respective tape guide posts. Among these deviations, the deviation of the tape height can be corrected easily, but it is difficult to independently correct the deviations of degree of parallelism of the tape and the tape twist because they have a mutually close relationship as described above.

The tape feeding system of the present invention enables the tape to travel smoothly by the provision of two adjusting means, that is, an adjusting means which serves to correct both the deviations of the degree of parallelism and the twist of the tape, and an adjusting means which serves to adjust the tape height.

Although these adjusting means are necessary where the size of the deviations originating in manufacturing and assembling the elements is relatively great, in the event that the size is relatively small stable tape-feeding can be obtained with only one adjusting means or without the adjusting means.

Figure 8:
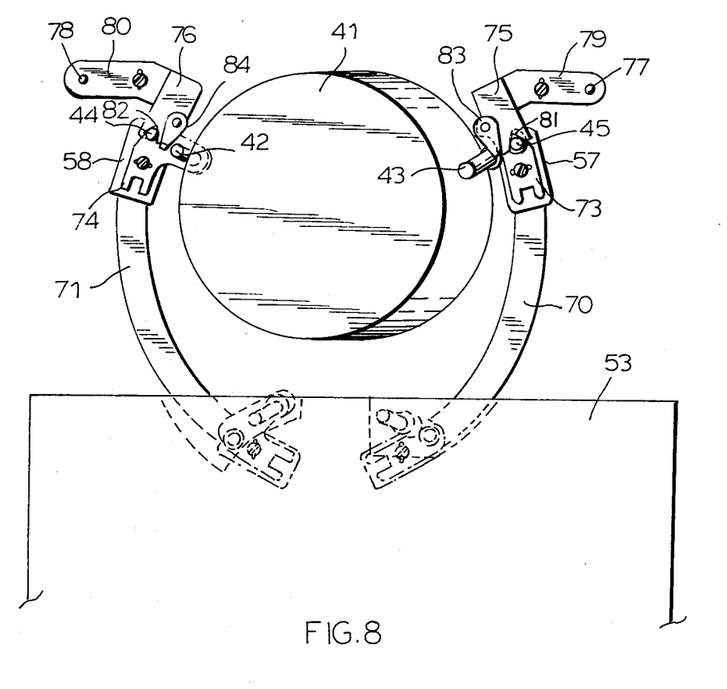
FIG. 8 is a schematic plan view of a principal portion of specific construction of the present invention.
Figure 9:
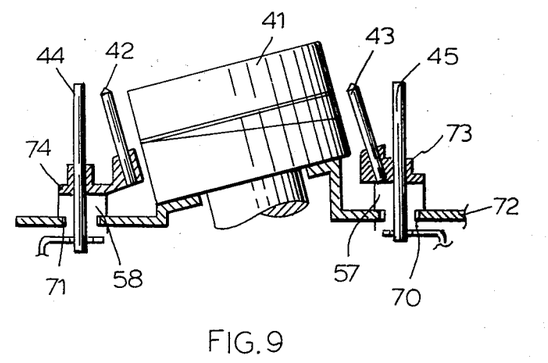
FIG. 9 is a sectional view of the principal portion of FIG. 8.
Figure 10:
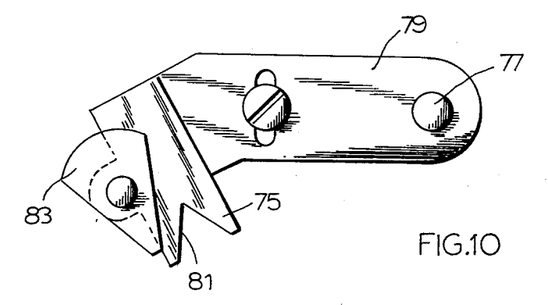
FIG. 10 is an enlarged detail of the restricting means for restricting the movement of post, shown in FIG. 8.
Figure 11:
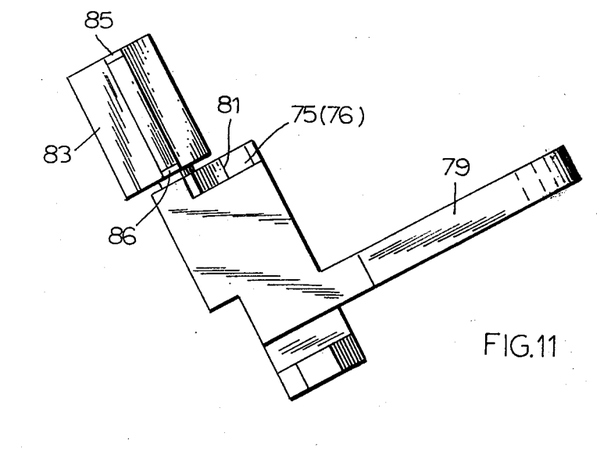
FIG. 11 is a side view of the restricting means shown in FIG. 10.

In the following, a specific embodiment of the tape feeding system of the present invention will be described with reference to FIGS. 8–11. Reference numeral 41 designates a cylindrical drum which contains one or more rotary heads therein and reference numerals 70 and 71 denote arcuate guide openings formed in a substrate so that they extend from the vicinity of the drum to the vicinity of the cassette mounted on the substitude in a predetermined portions. In the openings 70 and 71 are supporting members 57 and 58 which can move slidably along the openings when driven by driving means (not shown in the Figures). The supporting members 57 and 58 have the posts 45 and 44 thereon and are further provided with adjustment plates 73 and 74 which are rotatably mounted on the posts 45 and 44, respectively, the adjustment plates having posts 43 and 42, thereon. Reference numerals 75 and 76 designate stops placed at the ends of the openings 70 and 71 and fixed on arms 79 and 80 which are rotatably mounted on supporting poles 77 and 78. The stops 75 and 76 have V-shaped notches 81 and 82, therein and the posts 45 and 44 are engaged in the V-shaped notches 81 and 82 so that their movements are restricted, as shown in FIG. 8. Reference numerals 83 and 84 designate limiter means fixedly mounted on the arms 79 and 80. The limiter means 79 and 80 are provided with projecting members 85 and 86 at their upper and lower portions, and the tape movement in the direction of the width thereof is restricted by the projecting members. The adjustment of the position of the stops 47 and 48 shown in FIG. 6 can be made by rotation of the arms 79 and 80 about the supporting poles 77 and 78. The relationships between the posts 45 and 43 and between the posts 44 and 42 may be respectively adjusted by rotation of the adjustment plates 73 and 74 about the axes of the posts 45 and 44.

Figure 7:
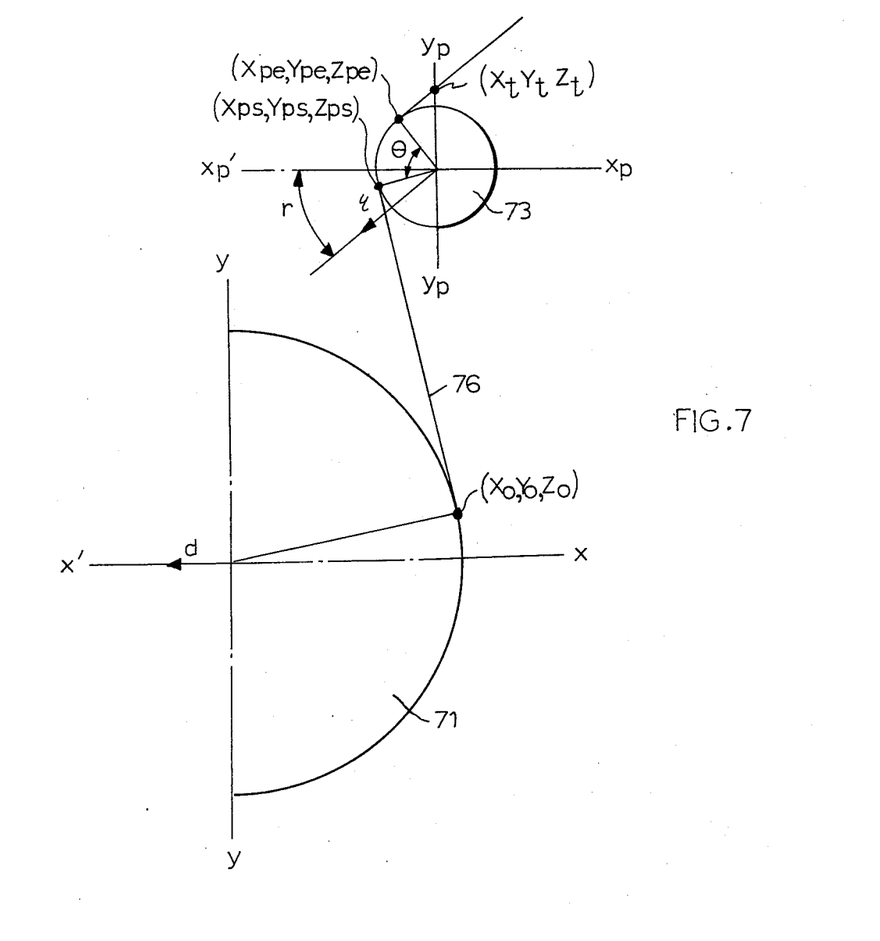
FIG. 7 is an explanatory view used for theoretically explaining the condition in which a tape travels stably.

The process for deriving the equations (1)–(3) will be described with reference to FIG. 7. FIG. 7 shows the tape feeding path in which the drum 71 and the post 73 are arranged perpendicularly to the datum plane. In this Figure, the axes $x$—$x'$ and $y$—$y'$ are the axes of co-ordinates with the origin at the center of the drum. The z-axis is perpendicular to the datum plane. The axes $x_p$—$x_p'$ and $y_p$—$y_p'$ are auxiliary co-ordinates with the origin at the center of the post 73. The longitudinal tape center line 76 extends around the drum 71, with the predetermined lead angle and is wound around the post 73 through angle $\theta$. The lead angle is in the direction in which the tape moves from the upper cylinder to lower cylinder in a playback mode. Reference marks in the form of [X, Y, Z] represent the space co-ordinates, each of which respectively represents the co-ordinates at the points where the longitudinal center line of the tape initially engages with the drum 71 and the post 73 and leaves the post 73, and the point where the longitudinal center line of the tape intersects the auxilially axis $[y_p$—$y_p']$. The symbols like those of angles in FIG. 7 designate the same dimensions as in the equations (1)–(3). In the Figure, the co-ordinates of the point $[X_o, Y_o, Z_o]$ is represented by the following equation.

$$[X_o, Y_o, Z_o] = [D/2 \cos\beta, D/2 \sin\beta, - D/2(\frac{\pi}{2} + \beta)\tan s].$$

If the co-ordinates of the point where the longitudinal center line of the tape initially engages the drum inclined at angle $\alpha$ in the X'-direction is $[X_o, Y_o, Z_o]$, the co-ordinates thereof are equivalent to that of the point where the point $[X_o, Y_o, Z_o]$ is projected on the axes of the co-ordinates which are rotated by $-\alpha$ about the axis $(y$—$y')$. Namely, the co-ordinates of the point $[X_o, Y_o, Z_o]$ may be obtained by co-ordinate transformation. If the co-ordinates of the respective points when the drum 71 and the post 73 are inclined at the predetermined angle in the predetermined direction, are designated by the small letters $x$, $y$ and $z$ with subscript letters, they are represented as follows:

$$[X_o, Y_o, Z_o] = [D/2 \cdot \cos\beta, D/2 \sin\beta, - D/2(\frac{\pi}{2} + \beta)\tan s][-\alpha]$$

$$[X_{pi}, Y_{pi}, z_{pi}] = [A,B,C][-\alpha]$$

$$[X_{pe}, Y_{pe}, Z_{pe}] = [D,E,F][-\zeta][-\beta][-\alpha] + [X_{pi}, Y_{pi}, Z_{pi}]$$

$$[X_r, Y_r, Z_r] = [G,H,J][-\zeta][-\beta][-\alpha] + [X_{pi}, Y_{pi}, Z_{pi}]$$

A bracket [] designates a matrix. In these determinants, newly adopted marks are as follows:

$A = D/2 \cos\beta - l \cos S \sin\beta$
$B = D/2 \sin\beta + l \cos S \cos\beta$ $$C = - D/2(\frac{\pi}{2} + \beta) \tan s - l \sin s$$

$D = \gamma (1 - \cos\theta)$
$E = \gamma \sin\theta$
$F = -\gamma\theta \tan\eta$
$G = D + \gamma \cot(\theta - \beta) \sin\theta$
$H = E + \gamma \cot(\theta - \beta) \cos\theta$
$J = F - \gamma \cot(\theta - \beta) \tan\eta$ $$[-\alpha] = \begin{bmatrix} \cos\alpha & , & 0 & , & \sin\alpha \\ 0 & , & 1 & , & 0 \\ -\sin\alpha & , & 0 & , & \cos\alpha \end{bmatrix}$$

$$[-\zeta] = \begin{bmatrix} 1 & , & 0 & , & 0 \\ 0 & , & \cos\zeta & , & \sin\zeta \\ 1 & , & -\sin\zeta & , & \cos\zeta \end{bmatrix}$$

$$[-\beta] = \begin{bmatrix} \cos\beta & , & \sin\beta & , & 0 \\ -\sin\beta & , & \cos\beta & , & 0 \\ 0 & , & 0 & , & 1 \end{bmatrix}$$

Accordingly, the conditions of the equations (1)–(3) can be solved by following equations.

(a) Condition of Height of the Tape:

$$z_{pe} = 0 \tag{1}$$

(b) Condition of Degree of Parallelism of the Tape:

$$z_{pe} = z_t \tag{2}$$

(c) Condition of No Twisting of the Tape:

$$\tan \gamma = \frac{Y_t - Y_{pe}}{X_t - X_{pe}} \tag{3}$$

In the foregoing, a description is given of the tape-feeding system in which the drum is inclined in the direction X—X' shown in FIG. 2. However, it is possible to cause the drum to be inclined in a direction other than the direction X—X'. In such a case, first, the direction of movement of the tape is determined so as to satisfy the conditions (a) and (b) by adjusting the angle of contact between the tape and the inclined post and then the inclined post, the perpendicular post and the drum are arranged so that a resultant vector which is parallel to the direction of movement of the tape in the path between the drum and the inclined post and a vector component of the angle of inclination of the drum is parallel to the direction of movement of the tape in the path between the inclined post and the perpendicular post.

Although the invention has been described in its preferred form with a certain degree of particularity, it is understood that changes in the present disclosure of the preferred form and the details of construction and the combination and arrangement of parts may be resorted without departing from the spirit and the scope of the invention as hereinafter claimed.

What we claim is:

1. A tape guiding means for a magnetic recording and reproducing apparatus comprising: a cylindrical tape guide drum around which a tape is to be helically wrapped, said guide drum containing two diametrically opposed magnetic transducing heads rotating in a plane normal to the axis of said guide drum, said guide drum being tilted with respect to a predetermined datum plane, the angle of contact of said tape around said guide drum being an angle at least exceeding 180°; a pair of support members adjacent to and on diametrically opposite sides of said drum; a pair of first entrance and exit guide posts for guiding the tape onto the guide drum and guiding the tape off the guide drum; a pair of second entrance and exit guide posts mounted perpendicular to said datum plane for guiding said tape to said first entrance guide post and away from said first exit guide post; said first and second entrance guide posts being mounted on one of said support members and said first and second exit guide posts being mounted on the other one of said support members; said first entrance guide post being tilted at an angle to said datum plane such that a resultant vector which is the vector sum of a vector component parallel to the direction of tape movement in the path between said guide drum and said first entrance guide post and a vector component of the angle of inclination of said guide drum is parallel to the direction of movement of the tape in the path between said first and second entrance guide posts, and said first exit guide post being tilted at an angle to said datum plane in the same relation to said second exit guide post as the relation between said first and second entrance guide posts, and said guide drum being inclined at an angle such that a second plane defined by the points at which the longitudinal center line of a tape extending over said guide posts and around said drum engages said first entrance guide post and at which it leaves said first exit guide post and the midpoint of the angle of engagement of the tape around said guide drum is substantially parallel to said datum plane, and limiter means between said first and second entrance and exit guide posts or on one of said guide posts for positioning the height of the tape with respect to said datum plane.

2. A tape guiding means according to claim 1, further comprising a pair of movable means one for engaging said first and second entrance guide posts and the other for engaging said first and second exit guide posts and movable for pulling the tape out of a tape housing means during a tape loading operation and engaging the tape around said guide drum.

3. A tape guiding means according to claim 2, further comprising a stop means engagable by said movable means at the position at which the tape is engaged with said drum for restricting the movement of said movable means, said stop means being movable in the direction parallel to a bisector of the engle of tape engagement with said drum.

4. A tape guiding means according to claim 1, further comprising an adjustment mechanism for adjusting the direction of the vector component corresponding to the angle of inclination of said guide posts with respect to the said datum plane and for adjusting the size of the vector component.

5. A tape guiding means according to claim 4 in which said adjustment mechanism comprises an adjustment plate which is rotatable about the axis of at least one of said second pair of guide posts and wherein at least one of said first pair of guide posts is mounted on said adjustment plate.

* * * * *

UNITED STATES PATENT AND TRADEMARK OFFICE
CERTIFICATE OF CORRECTION

PATENT NO. : 4,122,506
DATED : October 24, 1978
INVENTOR(S) : KANJI KUBO and OSAHIKO YANO It is certified that error appears in the above-identified patent and that said Letters Patent are hereby corrected as shown below:

Column 1, line 47, change "parallelism" to --Parallelism--;
line 48, delete "is to";
line 65, change "length" to --lengths--.

Column 2, line 3, after "that" insert --the--.

Column 3, line 16, after "of" insert --the--;
line 34, delete "line" (second occurrence);
line 40, after "the" insert --line--;
line 41, delete "line";
line 62, change "$\rho$" to --$\zeta$--.

Column 4, line 17, delete "the" (first occurrence).

Column 5, lines 20, 30, 33, 41 and 42 change "$\rho$" to --$\zeta$--.

Column 6, line 36, after "45" insert --,--.

Column 8, line 49, change "the" to --this--.

Column 9, line 15, after "small" insert --,--;
line 26, change "substitude" to --substrate--; delete "a"; change "portions" to --positions--;
line 38, change "82, therein" to --82 therein,--.

Column 10, line 4, change "auxilially" to --auxiliary--;
line 28, change "$[X_o, Y_o, Z_o]$" to --$[x_o, y_o, z_o]$--;
line 30, change "$[X_{ps}, Y_{ps}, Z_{ps}]$" to --$[x_{ps}, y_{ps}, z_{ps}]$--;
line 31, change "$[X_{pe}, Y_{pe}, Z_{pe}]$" to --$[x_{pe}, y_{pe}, z_{pe}]$--;

UNITED STATES PATENT AND TRADEMARK OFFICE
CERTIFICATE OF CORRECTION

PATENT NO. : 4,122,506
DATED : October 24, 1978
INVENTOR(S) : KANJI KUBO and OSAHIKO YANO It is certified that error appears in the above-identified patent and that said Letters Patent are hereby corrected as shown below:

Column 10, line 31, change "$[X_{ps}, Y_{ps}, Z_{ps}]$" to --$[x_{ps}, y_{ps}, z_{ps}]$--;

line 32, change "$[X_p, Y_p, Z_t]$" to --$[x_t, y_t, z_t]$--;

change "$[X_{ps}, Y_{ps}, Z_{ps}]$" to --$[x_{ps}, y_{ps}, z_{ps}]$--;

lines 36 & 37, change "cos S" to --cos s--;

lines 54, before bracket, delete ",".

Column 11, lines 5-7, change "$\tan\gamma = \dfrac{Y_t - Y_{pe}}{X_t - X_{pe}}$" to -- $\tan\gamma \dfrac{y_t - y_{pe}}{x_t - x_{pe}}$ --;

after line 18, insert --the vector sum of a vector component--.

Claim 3, line 6, change "parallet" to --parallel--; change "engle" to --angle--.

Signed and Sealed this

Seventeenth Day of July 1979

[SEAL]

Attest:

LUTRELLE F. PARKER

Attesting Officer    Acting Commissioner of Patents and Trademarks